(12) United States Patent
Katou et al.

(10) Patent No.: US 10,000,005 B2
(45) Date of Patent: Jun. 19, 2018

(54) ARTICLE VACUUM FORMATION METHOD AND VACUUM FORMING APPARATUS

(75) Inventors: Kenji Katou, Kariya (JP); Katsunori Oda, Kariya (JP)

(73) Assignee: Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 145 days.

(21) Appl. No.: 14/123,354

(22) PCT Filed: Aug. 3, 2012

(86) PCT No.: PCT/JP2012/069793
§ 371 (c)(1),
(2), (4) Date: Dec. 2, 2013

(87) PCT Pub. No.: WO2013/021927
PCT Pub. Date: Feb. 14, 2013

(65) Prior Publication Data
US 2014/0096897 A1    Apr. 10, 2014

(30) Foreign Application Priority Data
Aug. 10, 2011  (JP) .................................. 2011-175196

(51) Int. Cl.
*B29C 51/04*    (2006.01)
*B29C 55/12*    (2006.01)
(Continued)

(52) U.S. Cl.
CPC ............ *B29C 51/04* (2013.01); *B29C 51/262* (2013.01); *B29C 51/082* (2013.01); *B29C 51/10* (2013.01);
(Continued)

(58) Field of Classification Search
CPC ..... B29C 51/04; B29C 51/425; B29C 55/165; B29C 51/22; B29C 51/261; B29C 51/262;
(Continued)

(56) References Cited

U.S. PATENT DOCUMENTS 1,919,649 A * 7/1933 Griffin ...................... C14B 1/26
  69/19.3
2,759,217 A * 8/1956 Peterson ................. B29C 55/10
  156/494
(Continued)

FOREIGN PATENT DOCUMENTS

EP        1114715 A1 *  7/2001
JP         62-212107      9/1987
(Continued)

OTHER PUBLICATIONS

Machine translation of Japanese Patent Publication No. JP-2009078419A, originally published Apr. 2009, 24 pages.*
(Continued)

*Primary Examiner* — William P Bell
(74) *Attorney, Agent, or Firm* — Kilpatrick Townsend & Stockton

(57) ABSTRACT

A vacuum forming apparatus is provided that forms an article having a covering bonded to the surface of a substrate in a molding space using a first mold and a second mold. The vacuum forming apparatus is provided with clamps for grasping the covering between the first and second molds arranged at the open positions. The clamps are movable between an interfering position, at which the clamps are located in the movement ranges of the first and second molds, and standby positions, at which the clamps are outside the movement ranges. After the covering is heated, the clamps grasping the covering move to the standby positions and stretch the covering. The first and second molds move to the closed positions and the article is molded between the first and second molds so that the stretched covering and the substrate are bonded to each other.

4 Claims, 7 Drawing Sheets

(51) Int. Cl.
*B29C 51/26* (2006.01)
*B29C 51/16* (2006.01)
*B29C 51/08* (2006.01)
*B29C 51/42* (2006.01)
*B29C 51/10* (2006.01)

(52) U.S. Cl.
CPC ............ *B29C 51/16* (2013.01); *B29C 51/421* (2013.01); *B29C 2791/006* (2013.01); *Y10T 156/1028* (2015.01)

(58) Field of Classification Search
CPC ....... B29C 56/12; B29C 56/16; Y10S 264/73; C14B 1/26
See application file for complete search history.

(56) References Cited

U.S. PATENT DOCUMENTS

| | | | | |
|---|---|---|---|---|
| 3,287,765 A | * | 11/1966 | Puente | .................. B29C 51/262 269/237 |
| 4,674,972 A | * | 6/1987 | Wagner | .......................... 425/388 |
| 5,254,296 A | * | 10/1993 | Perlman | ................ B29C 55/005 264/288.4 |
| 5,843,492 A | * | 12/1998 | McCorry | ...................... 425/397 |
| 2007/0132159 A1 | | 6/2007 | Yoshitake et al. | |
| 2011/0308293 A1 | * | 12/2011 | Feil | ...................... B29C 51/262 72/372 |

FOREIGN PATENT DOCUMENTS

| | | |
|---|---|---|
| JP | 2007-160604 | 6/2007 |
| JP | 2009-078419 | 4/2009 |
| WO | WO 0040392 A1 * | 7/2000 |

OTHER PUBLICATIONS

Translation of International Preliminary Report on Patentability for PCT/JP2012/069793, dated Feb. 11, 2014, 5 pages.

* cited by examiner

Size of Conventional Substrate
Size of Substrate of Embodiment

Fig.4
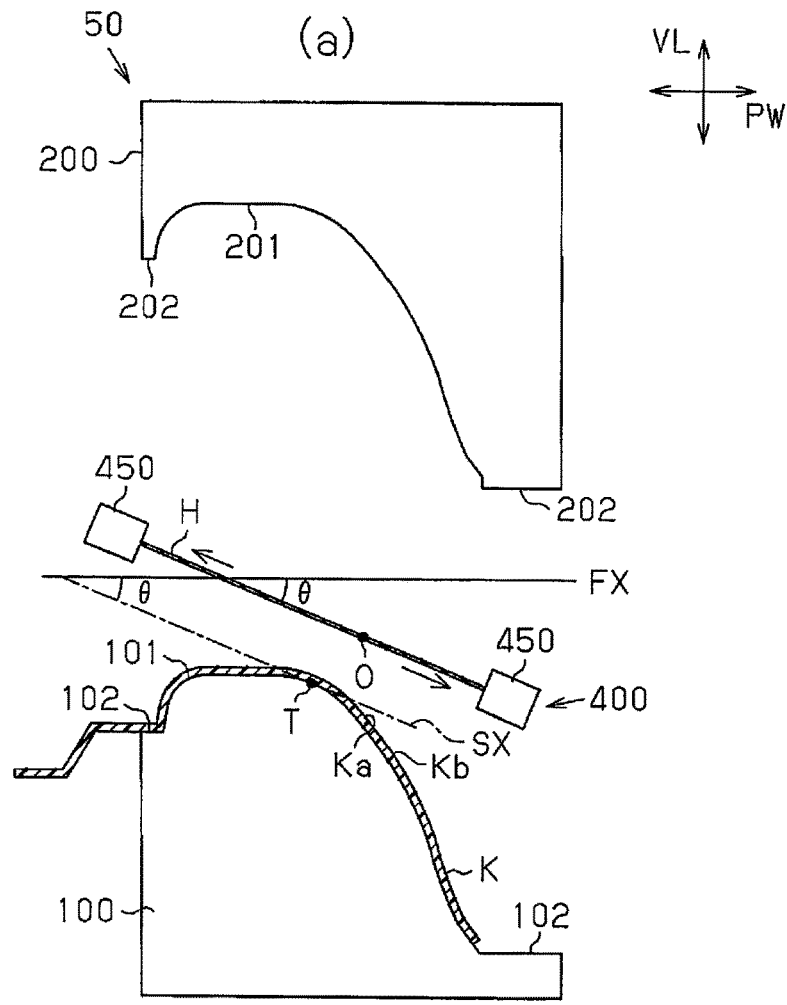
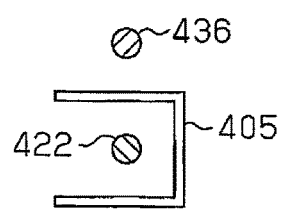
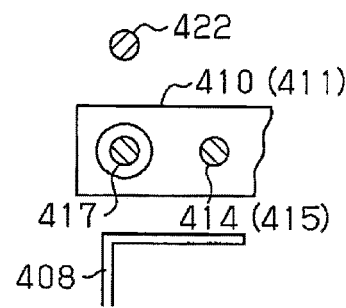

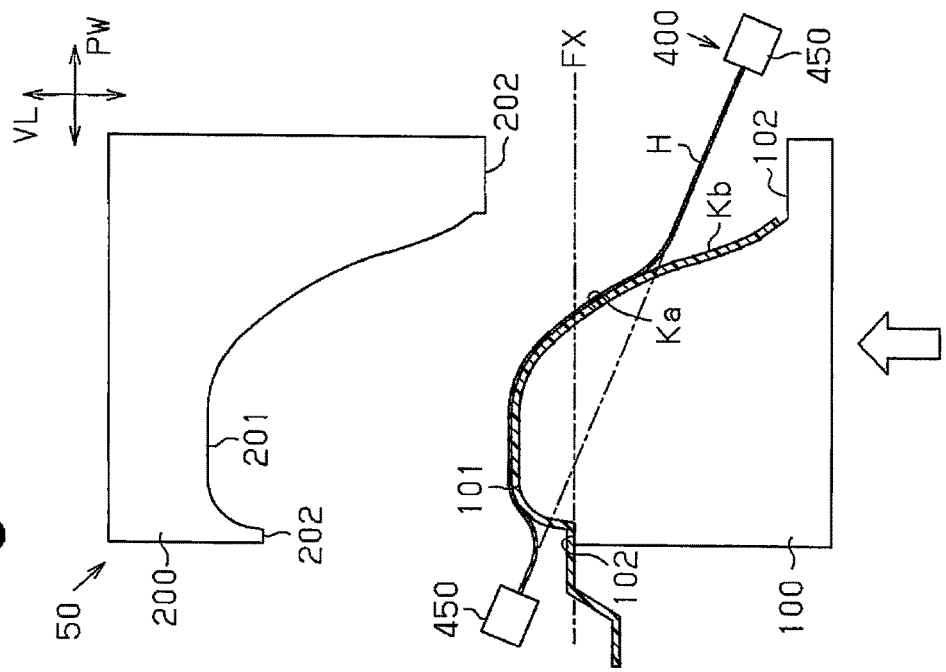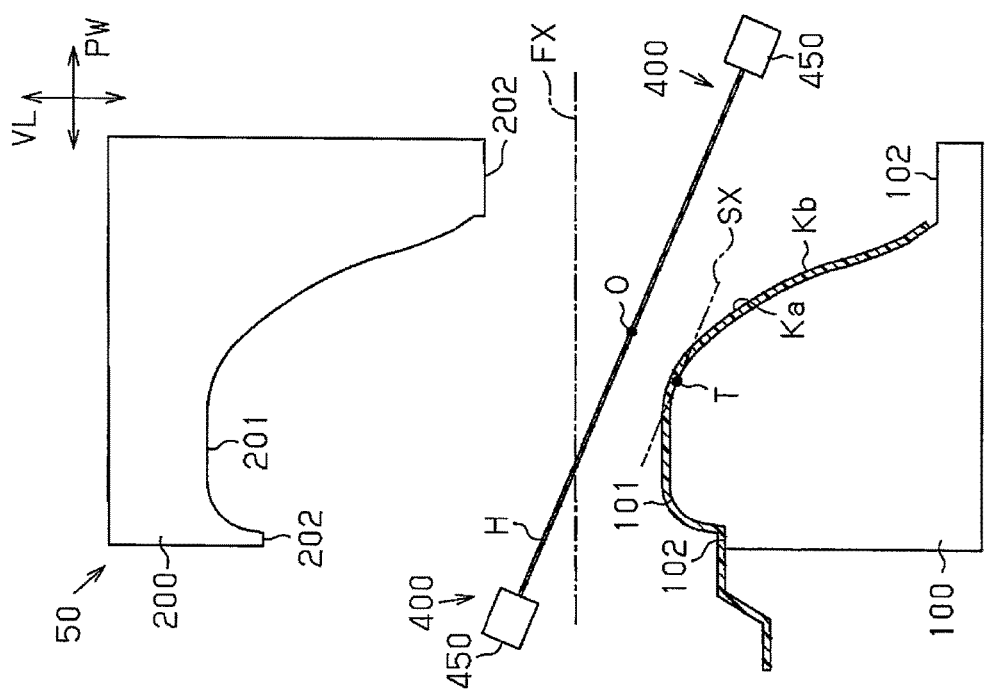

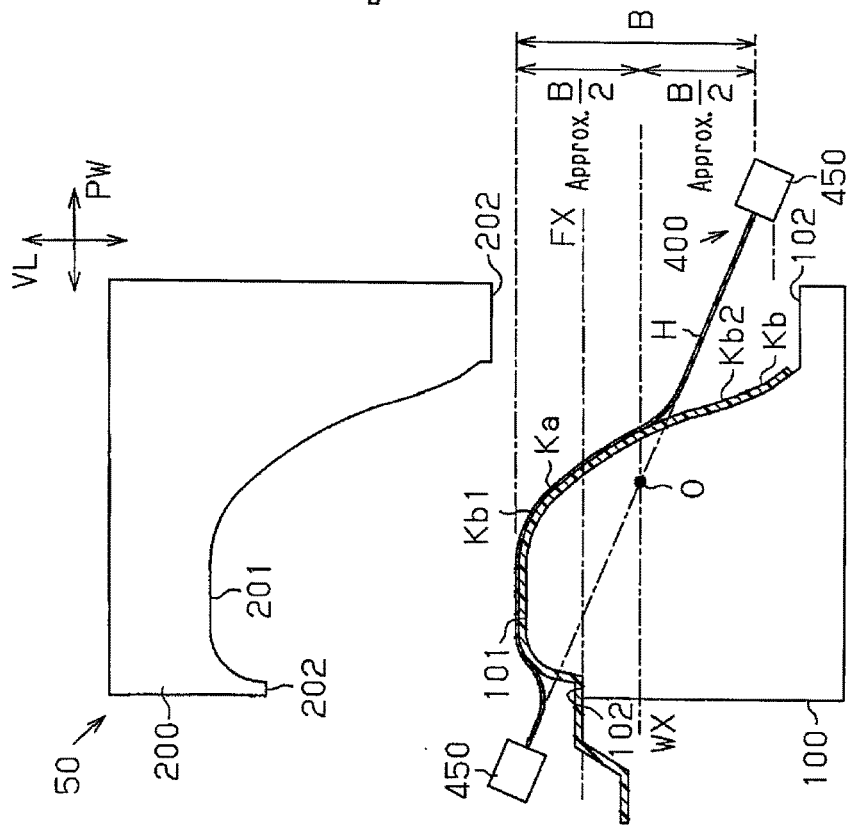

Fig.11 (Prior Art)
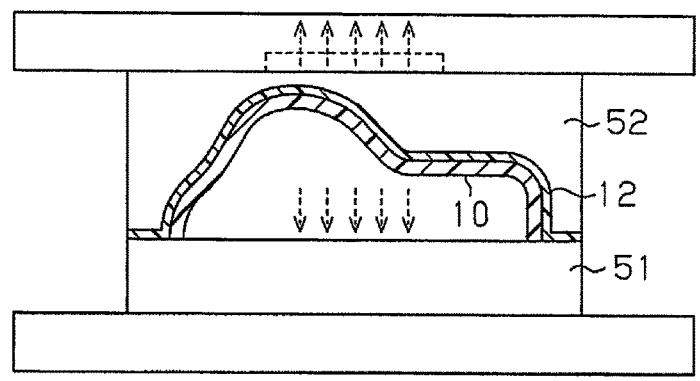
Fig.12 (Prior Art)
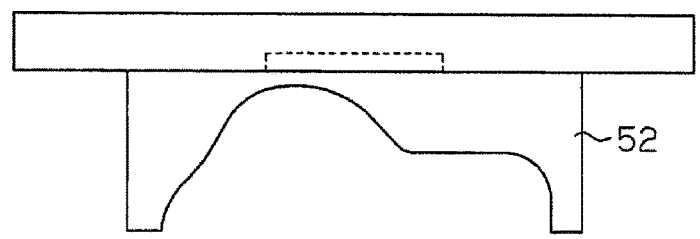
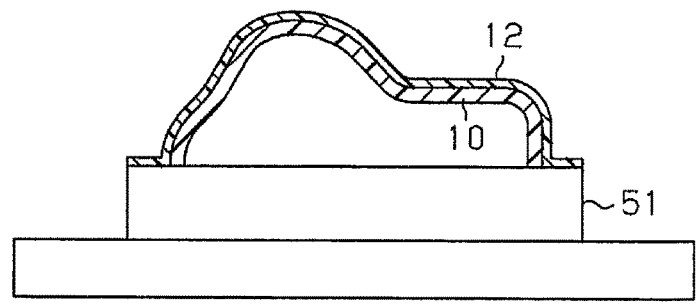

US 10,000,005 B2

ARTICLE VACUUM FORMATION METHOD AND VACUUM FORMING APPARATUS

FIELD OF THE INVENTION

The present invention relates to a vacuum forming method and a vacuum forming apparatus for an article having a covering bonded to a surface of a substrate.

BACKGROUND OF THE INVENTION

Conventionally, a vacuum forming apparatus for an article having a covering mounted on a substrate, such as an automobile interior component, includes a covering-side mold and a substrate-side mold to shape the covering and the substrate. The covering-side mold draws the covering with suction to shape the front surface of the covering in correspondence with the shape of the covering-side mold. The substrate-side mold draws the covering with suction through an air passage of the substrate such that the covering tightly contacts the surface of the substrate.

For example, an instrument panel, which is an automobile interior component, extends in the direction of the width of the vehicle and is mounted along the front windshield of the vehicle at the position facing the driver's seat and the front passenger seat. The instrument panel includes a covering, which is bonded to the surface of a portion of the substrate of the instrument panel. Specifically, the substrate and the covering are clamped between the substrate-side mold and the covering-side mold to be shaped as an integral body through a vacuum forming method.

As viewed in the direction of the vehicle width, the instrument panel is arranged in a zone including the vicinity of the glove compartment located on the side corresponding to the front passenger seat and the vicinity of the cockpit on the side corresponding to the driver's seat and curved in a manner projected from a front position of the vehicle toward the interior of the passenger compartment. The instrument panel is manufactured using vacuum forming apparatuses disclosed in, for example, Patent Documents 1 and 2.

A vacuum forming apparatus for an interior component described in Patent Document 1 will hereafter be described briefly with reference to FIGS. 10 to 12.

The vacuum forming apparatus has a first mold 52 (a covering-side vacuum suction mold) and a second mold 51 (a substrate-side vacuum suction mold), which are movable in the mold opening and closing direction VL (the vertical direction as viewed in FIG. 10). In advance, a substrate 10 is primarily shaped in a curved shape. With the first mold 52 and the second mold 51 maintained in an open state, the substrate 10 is attached to the second mold 51 such that the peak of the curved portion of the substrate 10 faces the first mold 52. A sheet-like covering 12 is arranged between the first mold 52 and the second mold 51, which are in the open state, and maintained horizontal by means of a clamp 55.

In forming operation, with the covering 12 held horizontal as shown in FIG. 10, the second mold 51 is raised to cause a portion of the covering 12 to cover the corresponding portion of the substrate 10. Subsequently, with reference to FIG. 11, the first mold 52 is lowered to cause the remaining portions of the covering 12 to cover the corresponding portions of the substrate 10. The first mold 52 and the second mold 51 are then closed. Then, the space between the first mold 52 and the second mold 51 is subjected to vacuum suction via the first mold 52 such that the front surface of the covering 12 is shaped in correspondence with the shape of the first mold 52. The second mold 51 then draws the covering 12 with suction through an air passage formed in the substrate 10 such that the covering 12 is bonded to the substrate 10. Afterwards, as illustrated in FIG. 12, the first mold 52 and the second mold 51 of the vacuum forming apparatus are separated from each other.

Generally, it is desired that the material forming the covering be small-sized to decrease costs. However, a small-sized covering may cause contact and interference between a holding member for holding the covering such as the clamp 55 and the molds when the covering is subjected to vacuum forming. This restricts the size reduction of the material forming the covering and the cost reduction of the covering.

PRIOR ART DOCUMENTS

Patent Documents

Patent Document 1: Japanese Laid-Open Patent Publication No. 2007-160604
Patent Document 2: Japanese Laid-Open Patent Publication No. 2009-78419

SUMMARY OF THE INVENTION

Problems that the Invention is to Solve

Accordingly, it is an objective of the present invention to provide a vacuum forming method and a vacuum forming apparatus for an article that can employ a small-sized material for a covering without causing contact between a covering holding member and a mold and thus permits cost reduction for the covering.

To achieve the foregoing objective, and in accordance with one aspect of the present invention, a vacuum forming method is provided for shaping an article having a covering bonded to a surface of a substrate in a molding space using a first mold and a second mold. The first mold and the second mold are movable between respective closed positions for forming the molding space and respective open positions for opening the molding space. The first mold has a forming surface for the covering, and the second mold has a support surface for the substrate. The substrate has an air passage. The method includes: holding a peripheral edge of the covering with a plurality of holding members to spread the covering in a flat state between the first mold and the second mold arranged at the open positions; heating the covering held by the holding members with a heater; moving the holding members from interference positions in movement ranges of the first mold and the second mold to standby positions outside the movement ranges, thereby stretching the covering, which has been heated by the heater; moving the first mold and the second mold toward the closed positions with the substrate mounted on the support surface of the second mold to cause the stretched covering to contact the substrate and deform the covering in correspondence with the shape of the forming surface of the first mold, and performing vacuum suction of the molding space via the first mold at the closed position to shape the covering in correspondence with the shape of the forming surface; and after the vacuum suction via the first mold is stopped, performing vacuum suction of the molding space via the second mold and the air passage of the substrate, thereby bonding the covering to the substrate.

In accordance with another aspect of the present invention, a vacuum forming apparatus is provided for shaping an article having a covering bonded to a surface of a substrate in a molding space. The apparatus has a first mold and a second mold, which are movable between respective closed positions for forming the molding space and respective open positions for opening the molding space. The first mold has a forming surface for the covering, and the second mold has a support surface for the substrate. The apparatus further includes a support device having a plurality of holding members for holding a peripheral edge of the covering to spread the covering in a flat state between the first mold and the second mold arranged at the open positions, and a heater for heating the covering held by the holding members when the first mold and the second mold are arranged at the open positions. The substrate has an air passage. The first mold and the second mold are moved toward the closed positions with the substrate mounted on the support surface of the second mold to cause the covering, which has been heated by the heater, to the substrate and deform the covering in correspondence with the shape of the forming surface of the first mold, and performing vacuum suction of the molding space via the first mold at the closed position to shape the covering in correspondence with the shape of the forming surface. After the vacuum suction via the first mold is stopped, vacuum suction of the molding space is performed via the second mold and the air passage of the substrate, thereby bonding the covering to the substrate. The support device is movable between an interference position, where the holding members are arranged in movement ranges of the first mold and the second mold, and a standby position outside the movement ranges. When moving to the standby position, the support device stretches the covering, which is held by the holding members and has been heated by the heater.

The present invention provides a vacuum forming method and a vacuum forming apparatus for an article that can employ a small-sized material for a covering without causing contact between a covering holding member and a mold and thus permits cost reduction for the covering.

BRIEF DESCRIPTION OF THE DRAWINGS

FIG. 4(a) is a cross-sectional view schematically showing the vacuum forming apparatus;

FIG. 4(b) is a cross-sectional view taken along line 4(b)-4(b) of FIG. 1;

FIG. 4(c) is a cross-sectional view taken along line 4(c)-4(c) of FIG. 1;

FIG. 5 is an explanatory diagram showing a mold open state of the vacuum forming apparatus;

FIG. 6 is an explanatory diagram showing a step of a vacuum forming method for the instrument panel;

FIG. 7 is an explanatory diagram showing another step of the vacuum forming method for the instrument panel;

FIG. 8 is an explanatory diagram showing another step of the vacuum forming method for the instrument panel;

FIG. 11 is an explanatory diagram showing another step performed by the conventional vacuum forming apparatus; and FIG. 12 is an explanatory diagram showing another step performed by the conventional vacuum forming apparatus.

DETAILED DESCRIPTION OF THE PREFERRED EMBODIMENTS

A vacuum forming method and a vacuum forming apparatus for an instrument panel will now be described with reference to FIGS. 1 to 9 as an embodiment of a vacuum forming method and a vacuum forming apparatus for an article according to the present invention.

Figure 3:
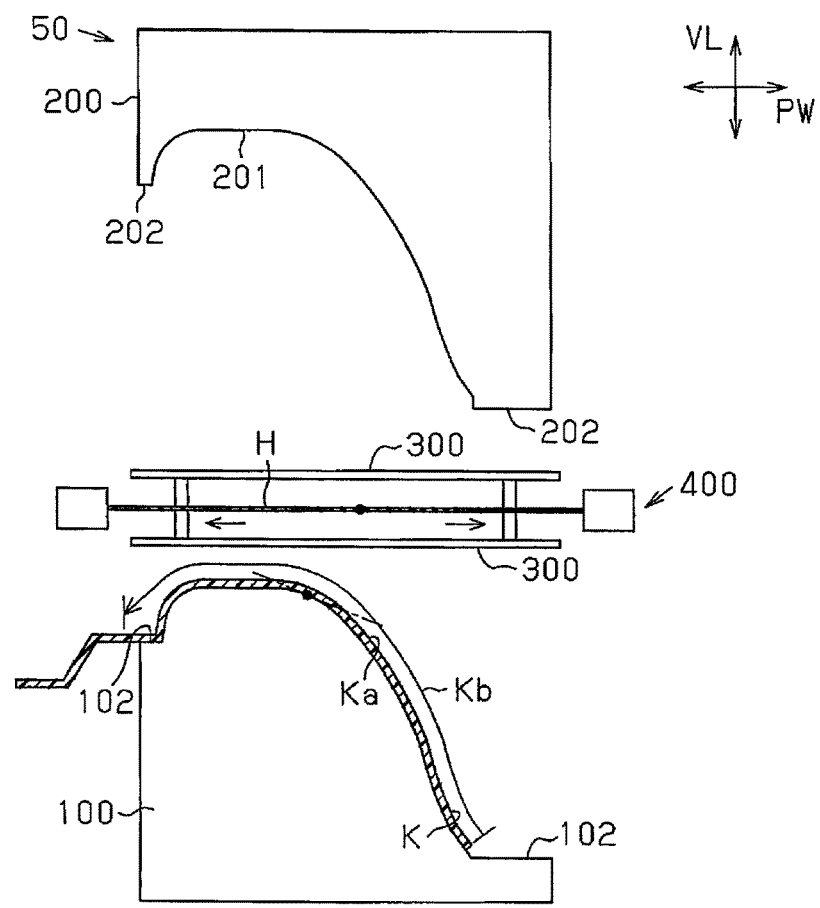
FIG. 3 is a cross-sectional view schematically showing the vacuum forming apparatus.
Figure 10:
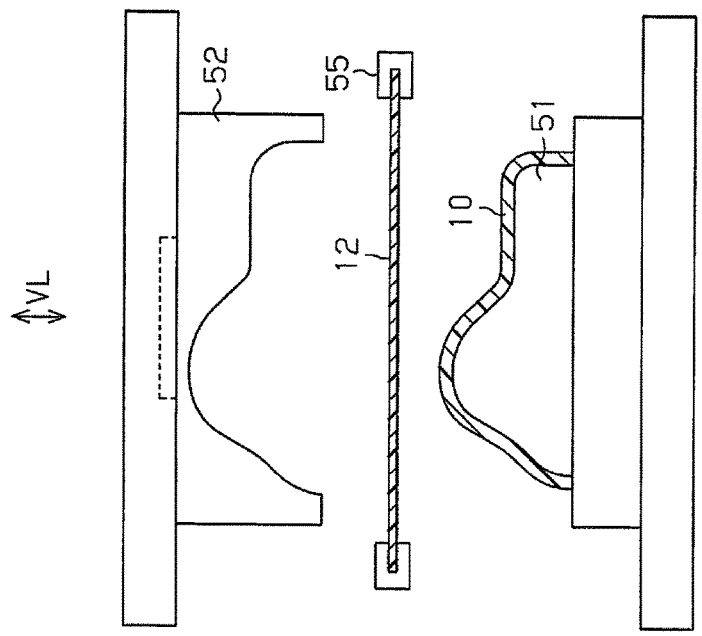
FIG. 10 is an explanatory diagram showing a step performed by a conventional vacuum forming apparatus.
Figure 9:
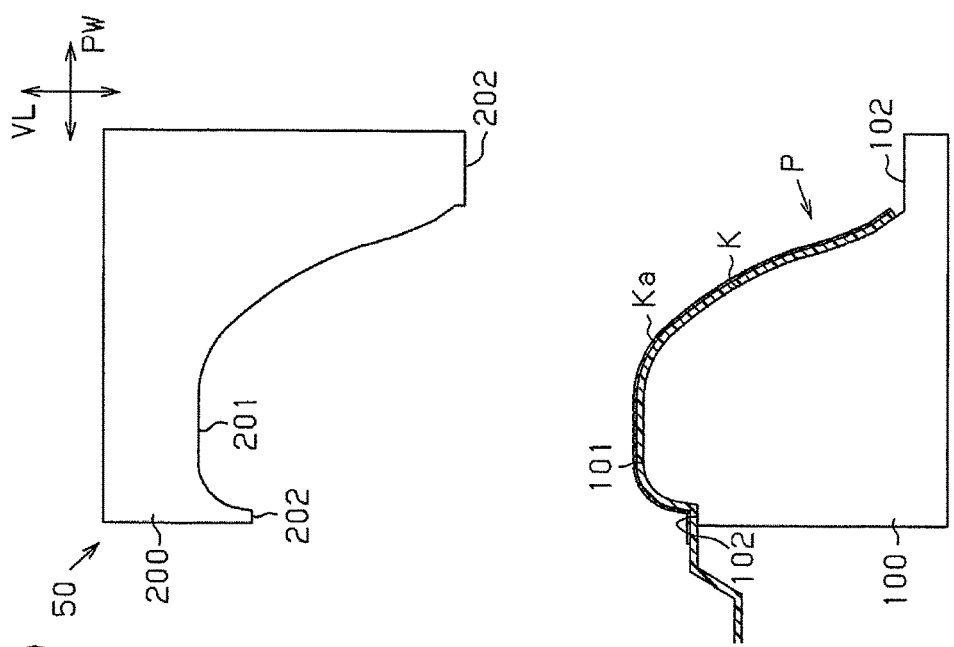
FIG. 9 is an explanatory diagram showing another step of the vacuum forming method for the instrument panel.

A vacuum forming apparatus 50 of the illustrated embodiment, which is shown in FIG. 3, shapes an instrument panel P (see FIG. 9) by causing tight contact between a substrate K, which has been shaped primarily in a predetermined shape, and a sheet-like covering H as an integral body through a vacuum forming method.

As shown in FIGS. 3 to 9, the vacuum forming apparatus 50 has a first mold 200 and a second mold 100, which faces the first mold 200. The second mold 100 is movable up and down in mold opening and closing direction VL (the vertical direction as viewed in FIGS. 3 to 9) by means of a non-illustrated lift mechanism. The first mold 200 is also movable up and down in the mold opening and closing direction VL by means of another non-illustrated lift mechanism.

Specifically, in FIGS. 3 to 9, the left-and-right direction perpendicular to the mold opening and closing direction VL is referred to as a transverse direction PW. The direction perpendicular to the mold opening and closing direction VL and the transverse directions PW (the directions perpendicular to the sheet surface of each drawing) is referred to as a longitudinal direction PL (see FIG. 1). The longitudinal direction PL corresponds to the longitudinal direction of the instrument penal P, which matches with the direction of the width of the vehicle.

Referring to FIG. 3, the second mold 100 is an air permeable mold having a non-illustrated air vent portion. The second mold 100 has a projected support surface 101 for supporting the substrate K, which has been subjected to primary shaping in advance, from inside. The second mold 100 is attached to the non-illustrated lift mechanism and movable up and down between the open position shown in FIG. 3 and the closed position shown in FIG. 8. As shown in FIG. 3, the second mold 100 has a mold clamping surface 102, which is formed around the support surface 101. The second mold 100 is connected to a non-illustrated substrate-side suction device. The substrate-side suction device is actuated to draw gas through the air vent portion of the support surface 101.

The first mold 200 is air permeable and structured to cover a portion of the surface of the substrate K to which the covering H is bonded to shape the front surface of the skin surface H. The first mold 200 is attached to the non-illustrated lift mechanism and movable up and down between the open position shown in FIG. 3 and the closed position shown in FIG. 8. When the first mold 200 and the second mold 100 are at the respective closed positions, the molding space S is formed between the first mold 200 and the second mold 100 to receive the substrate K and the covering H (see FIG. 8). When the first mold 200 and the second mold 100 are at the open positions, the molding space S is open.

A forming surface 201 is formed on a lower side, which is an inner surface, of the first mold 200 to shape the front surface of the covering H. A mold clamping surface 202, which is shaped to match the shape of the mold clamping surface 102 of the second mold 100, is formed on the lower side of the first mold 200 and arranged around the forming surface 201. The first mold 200 is connected to a non-illustrated covering-side suction device. The covering-side suction device is operated to draw gas from the molding space S through the forming surface 201.

Covering Clamp Device 400

Figure 1:
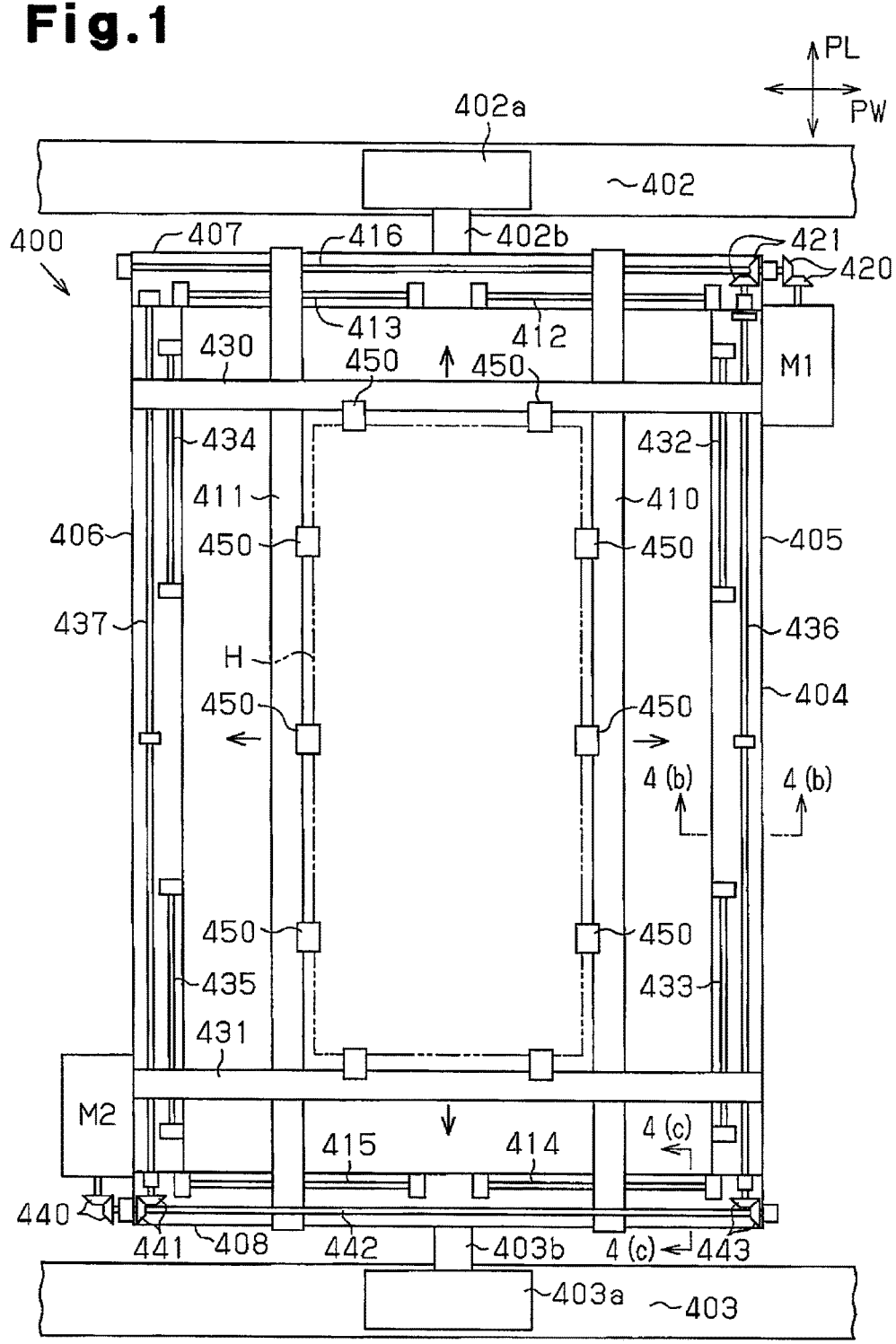
FIG. 1 is a plan view showing a covering clamp device of a vacuum forming apparatus.

A covering clamp device 400 is arranged between the first mold 200 and the second mold 100. As shown in FIG. 1, the covering clamp device 400 includes a rectangular outer frame 404, which is supported in a manner inclinable relative to a pair of beam members 402, 403 extending in the transverse direction PW. The outer frame 404 is configured by a pair of frame members 405, 406 extending in the longitudinal direction PL and a pair of frame members 407, 408 extending in the transverse direction PW to connect the corresponding ends of the frame members 405, 406. Each of the frame members 405, 406, 407, 408 has a U-shaped cross section (see FIG. 4(*b*)).

Each of the beam members 402, 403 has a bearing 402*a*, 403*a*. Each of the frame members 407, 408 is supported by the corresponding one of the bearings 402*a*, 403*a* and allowed to incline through a corresponding shaft 402*b*, 403*b* extending in the longitudinal direction PL. The shafts 402*b*, 403*b* are coaxial about the axis O (see FIG. 4) and operably connected to a non-illustrated drive motor through a transmission mechanism.

A pair of frame members 410, 411, which is movable in the transverse direction PW, extends between the frame members 407, 408 of the outer frame 404. Guide rods 412, 413 extending in the transverse direction PW are fixed to the frame member 407. Guide rods 414, 415, which also extend in the transverse direction PW, are fixed to the frame member 408. The guide rods 412, 413, 414, 415 are each extended and passed through the corresponding end of the frame member 410, 411. The guide rods 412 to 415 allow the frame members 410, 411 to move parallel to each other on the same plane.

A threaded bar 416 (see FIG. 1) and a threaded bar 417 (see FIG. 4(*c*)), which extend in the transverse direction PW, are supported by and mounted on the frame member 407 and the frame member 408, respectively. The threaded bars 416, 417 are extended and passed through the corresponding ends of the frame members 410, 411.

Each threaded bar 416, 417 is threaded to a non-illustrated nut body arranged in each of the corresponding ends of the frame members 410, 411. Specifically, in each threaded bar 416, 417, a threaded portion corresponding to the movement range of the frame member 410 and a threaded portion corresponding to the movement range of the frame member 411 have the same pitch but are oriented in opposite directions. As a result, if the threaded bars 416, 417 rotate in a first direction, the frame members 410, 411 move to approach each other. If the threaded bars 416, 417 rotate in a second direction, which is opposite to the first direction, the frame members 410, 411 move away from each other.

As shown in FIG. 1, a motor M1 is fixed to an outer side of the frame member 405 and an end of the threaded bar 416 is operably connected to the output shaft of the motor M1 through a gear mechanism 420. Referring to FIG. 4(*b*), a transmission shaft 422 is supported in the frame member 405 in a manner rotatable about the axis extending in the longitudinal direction PL. The aforementioned end of the threaded bar 416 is operably connected to one end of the transmission shaft 422 through the gear mechanism 421. The other end of the transmission shaft 422 is operably connected to the threaded bar 417 through a non-illustrated gear mechanism extended to a position on the frame member 408. As a result, by reversing the rotating direction of the motor M1, the frame members 410, 411 are moved toward or away from each other.

A pair of frame members 430, 431 extends between the frame members 405, 406 of the outer frame 404. The frame members 430, 431 are arranged above the frame member 410, 411 and movable in the longitudinal direction PL. With reference to FIG. 1, as viewed from above the covering clamp device 400, the frame members 410, 411, 430, 431 cooperate with one another to form a central rectangular area. Guide rods 432, 433 extending in the longitudinal direction PL are mounted on and fixed to the frame member 405. Guide rods 434, 435 extending in the longitudinal direction PL are arranged on and fixed to the frame member 406. Each of the guide rods 432, 433, 434, 435 is extended and passed through the corresponding ends of the frame members 430, 431. The guide rods 432 to 435 allow the frame members 430, 431 to move parallel to each other on a plane. Each of the frame members 410, 411, 430, 431 corresponds to a support device.

A threaded bar 436 (see FIG. 1) and a threaded bar 437 (see FIG. 4(*b*)), which extend in the longitudinal direction PL, are supported by and mounted on the frame member 405 and the frame member 406, respectively. Each of the threaded bars 436, 437 are extended and passed through the corresponding ends of the frame members 430, 431.

Each threaded bar 436, 437 is threaded to a non-illustrated ball screw nut arranged in each of the corresponding ends of the frame members 430, 431. Specifically, in each threaded bar 436, 437, a threaded portion corresponding to the movement range of the frame member 430 and a threaded portion corresponding to the movement range of the frame member 431 have the same pitch but are oriented in opposite directions. As a result, if the threaded bars 436, 437 rotate in a first direction, the frame members 430, 431 move toward each other. If the threaded bars 436, 437 rotate in a second direction opposite to the first direction, the frame members 430, 431 move away from each other.

A transmission shaft 442 is arranged on the frame member 408 and extended in the transverse direction PW. A motor M2 is fixed to an outer surface of the frame member 406. One end of the transmission shaft 442 is operably connected to the output shaft of the motor M2 through a gear mechanism 440. An end of the threaded bar 437 is operably connected to the transmission shaft 442 through a gear mechanism 441.

As shown in FIG. 1, one end of the threaded bar 436 is operably connected to the other end of the transmission shaft 442 through a gear mechanism 443. As a result, by reversing the rotating direction of the motor M2, the frame members 430, 431 are moved toward or away from each other.

With reference to FIG. 1, a plurality of clamps 450 are attached to the frame members 410, 411, 430, 431. Each of the clamps 450 is capable of holding the peripheral edge of the covering H. The number and the positions of the clamps 450 are selected to produce such a tension that the covering H as a whole is maintained in a flat state. The clamps 450 each correspond to a holding member.

The vacuum forming apparatus 50 includes a heater 300 (see FIG. 3) for thermally softening the covering H, which is maintained flat by the clamps 450, from both the front surface and the back surface of the covering H. The heater 300 is arranged outside the movement ranges of the first mold 200 and the second mold 100 in the mold opening and closing direction VL. The heater 300 is horizontally movable between a standby position (not shown) and the covering heating position illustrated in FIG. 3. When located at the standby position, the heater 300 is prevented from interfering with the first mold 200 in motion and the second mold 100 in motion. The covering heating position is arranged in the movement ranges of the first mold 200 and the second mold 100 in the mold opening and closing direction VL.

Instrument Panel P

Figure 2:
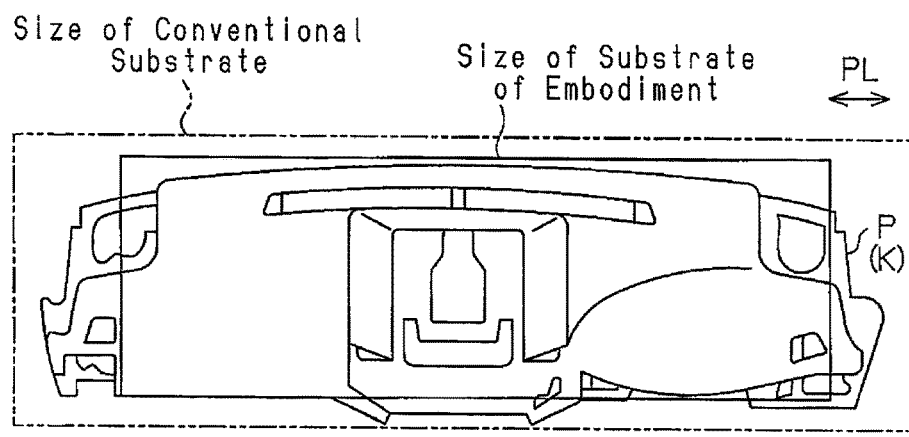
FIG. 2 is a plan view schematically showing a substrate of an instrument panel according to an embodiment of the present invention.

As shown in FIG. 2, the instrument panel P, which is shaped by the vacuum forming apparatus 50, is mounted behind a non-illustrated windshield of the vehicle at a position facing the driver's seat and the front passenger seat. The instrument panel P is oriented such that the longitudinal direction PL of the instrument panel P matches with the direction of the width of the vehicle and the transverse direction PW of the instrument panel P matches with the front-and-rear direction of the vehicle. The front passenger seat is located on the left side and the driver's seat is arranged on the right side as viewed in FIG. 2. The instrument panel P is configured by the substrate K and the covering H. Precisely, the thickness of the instrument panel P is greater than the thickness of the substrate K by the amount corresponding to the thickness of the covering H. However, for illustrative purposes, FIG. 2 illustrates the instrument panel P and the substrate K in the identical shapes.

Substrate K and Covering H

The substrate K is a plate-like material formed of plastic such as polypropylene (PP) through injection molding. A portion of the substrate K has a curved portion Ka (see FIG. 3), which is curved in a manner projected in the direction of the thickness of the substrate K. The substrate K has a plurality of fine air passages (not shown), each of which has a fine diameter and extends through the substrate K in the direction of the thickness. Part of the surface of the curved portion Ka has a covering receiving portion Kb, which is to be covered by the covering H.

The covering H is formed by, for example, joining a foaming layer formed of polypropylene foam (PP foam) to a thin film layer formed of thermoplastic olefin (TPO). The thin film layer (the front surface) is shaped by the first mold 200 through vacuum formation. An olefin-based hot-melt adhesive, for example, is applied to the back surface (the foaming layer) of the covering H.

Operation of Embodiment

Operation of the vacuum forming apparatus 50, which has the above-described configuration, will hereafter be described.

As illustrated in FIG. 3, the substrate K, which has been shaped primarily in a predetermined shape, is arranged on the second mold 100 such that an end of the curved portion Ka in the transverse direction PW is lower than the other end of the curved portion Ka and that the back surface of the substrate K is supported by the support surface of the second mold 100.

The dimensions of the covering H in the longitudinal direction PL and the transverse direction PW are smaller than the dimensions of each mold in the corresponding directions. FIG. 3 demonstrates that the dimension of the covering H in the transverse direction PW is smaller than the dimension of the vacuum forming apparatus 50 in the transverse direction PW.

As represented by the solid line frame in FIG. 2, the covering H is smaller in size than the substrate K in the longitudinal direction PL and the transverse direction PW.

With reference to FIG. 3, the covering H is held and fixed by the clamps 450 of the covering clamp device 400 with the back surface of the covering H facing the curved portion Ka of the substrate K and the front surface of the covering H facing the first mold 200. In this state, the clamps 450 are arranged at such positions that the clamps 450 may interfere with the first mold 200 and the second mold 100. In other words, the clamps 450 are located in the movement ranges of the first mold 200 and the second mold 100 in the mold opening and closing direction VL.

Subsequently, the front surface and the back surface of the covering H are heated by the heater 300, which is located at the covering heating position. After the covering H is softened, the motor M1 and the motor M2 of the covering clamp device 400 are actuated such that the frame member 410 and the frame member 411 move away from each other and that the frame member 430 and the frame member 431 move away from each other, as illustrated in FIG. 1, to stretch the covering H.

After the heater 300 is retracted to the standby position, the non-illustrated motor is operated to rotate the outer frame 404 about the axis O of the shafts 402b, 403b, referring to FIG. 4. In this manner, the covering H is inclined until the angle between the horizontal mold clamping reference line FX, which is located between the first mold 200 and the second mold 100 arranged at the open positions, and the front surface of the covering H becomes to the inclination angle θ. Meanwhile, the softened covering H is continuously stretched by the clamps 450 to move the clamps 450 to the standby positions illustrated in FIG. 5, where the clamps 450 are prevented from interfering with the molds. That is, the clamps 450 are moved out of the movement ranges of the first mold 200 and the second mold 100 in the mold opening and closing direction VL.

When the covering H is inclined to the inclination angle θ, the second mold 100 is raised. This causes contact between the covering H and the substrate K at the reference contact point T (see FIG. 4(a)) on the covering receiving portion Kb of the curved portion Ka in the substrate K. The position of the contact reference point T is determined in advance before inclining the covering H. Specifically, the shape of the surface of the curved portion Ka is considered to determine the position of the reference contact point T. In the illustrated embodiment, the reference contact point T is located in the vicinity of the peak of the curved portion Ka.

As has been described, by inclining the outer frame 404, the covering H is inclined such that the covering H extends parallel to the tangential line SX at the reference contact point T, or, in other words, the angle between the tangential line SX and the mold clamping reference line FX becomes equal to the inclination angle θ.

Then, as illustrated in FIG. 6, the second mold 100 is raised to cause an upper portion of the covering receiving portion Kb of the curved portion Ka of the substrate K to contact the inclined covering H.

In other words, the portion in the vicinity of the center of the covering receiving portion Kb of the substrate K, which is mounted on the support surface 101 of the second mold 100, in the transverse direction PW reaches the mold clamping reference line FX. As a result, as illustrated in FIG. 7, an upper receiving portion Kb1 of the covering receiving portion Kb, which is located close to the first mold 200 with respect to the mold clamping reference line FX, is covered by the corresponding portion of the covering H.

In the illustrated embodiment, the dimension of the curved portion Ka of the substrate K in the mold opening and closing direction VL is defined as the curved portion height B. The line crossing a substantial middle of the curved portion height B (in FIG. 7, approximately B/2) and extending parallel to the mold clamping reference line FX is defined as a curved portion middle line WX. The portion of the covering receiving portion Kb above the curved portion middle line WX is covered by the covering H.

In this covering step, the second mold 100 is moved until the portion in the vicinity of the center of the covering receiving portion Kb of the substrate K, which is arranged on the support surface 101 of the second mold 100, in the transverse direction PW reaches the mold clamping reference line FX. At this stage, the second mold 100 is raised with the substrate K, which is mounted on the second mold 100, maintained in contact with the corresponding portion of the covering H. The second mold 100 thus presses the portion of the covering H held in contact with the substrate K, thus deforming the portion of the covering H in correspondence with the shape of the second mold 100. This causes the deformed portion of the covering H to cover the upper receiving portion Kb1 of the covering receiving portion Kb.

The above-described covering step is followed by the subsequent covering step described below.

As illustrated in FIG. 8, the first mold 200 is lowered such that the remaining portion of the covering H contacts a lower portion of the covering receiving portion Kb of the curved portion Ka. Specifically, with reference to FIGS. 7 and 8, in this covering step, the first mold 200 is moved toward the second mold 100 such that a lower receiving portion Kb2, which does not include the upper receiving portion Kb1, of the covering receiving portion Kb is covered by the remaining portion of the covering H.

Specifically, as illustrated in FIGS. 7 and 8, by lowering the first mold 200 toward the second mold 100, the forming surface 201 of the first mold 200 is caused to press the remaining portion of the covering H and thus deform the portion of the covering H in correspondence with the shape of the forming surface 201 of the first mold 200. As a result, the lower receiving portion Kb2 of the covering receiving portion Kb, which does not include the upper receiving portion Kb1, is covered by the remaining portion of the covering H.

Then, the first mold 200 and the second mold 100 are closed. In the illustrated embodiment, the molds are closed with the covering H maintained in a state inclined at the inclination angle θ with respect to the mold clamping reference line FX. The first mold 200 and the second mold 100 are moved toward each other until the first mold 200 and the second mold 100 fit each other at the mold clamping reference line FX.

Specifically, in the vacuum forming method and the vacuum forming apparatus for an interior component of the illustrated embodiment, the first mold 200 and the second mold 100 are closed with the covering H held in an inclined state at such an angle that interference of the covering H with the molds 100, 200 is limited and that the extent of such interference is equilibrated in the transverse direction PW of the instrument panel P.

After the first mold 200 and the second mold 100 are closed, the covering H and the substrate K are clamped with the back surface of the covering H held in contact with the covering receiving portion Kb of the curved portion Ka of the substrate K in the molding space S.

Subsequently, the non-illustrated covering-side suction device is actuated to draw the covering H through air holes (not shown) formed in the first mold 200 from the side corresponding to the front surface of the covering H for a predetermined time at a predetermined vacuum pressure. This produces negative pressure in the molding space S such that the front surface of the covering H is drawn to the forming surface 201. As a result, the covering H is shaped to have a predetermined texture (such as transferred grain patterns or fine patterns).

Then, suction of the first mold 200 through the air holes using the covering-side suction device is completely stopped. Afterwards, the non-illustrated substrate-side suction device is actuated to draw the covering H through air holes (not shown) formed in the second mold 100 and the fine air passages (not shown) of the substrate K from the side corresponding to the back surface of the covering H for a predetermined time at a predetermined vacuum pressure. As a result, the back surface of the covering H is drawn to the surface of the covering receiving portion Kb of the curved portion Ka of the substrate K. The adhesive applied onto the back surface of the covering H thus bonds the covering H to the substrate K.

Afterwards, the first mold 200 and the second mold 100 are separated from each other to remove the instrument panel P, which has the covering H and the substrate K bonded integrally with each other, out from the second mold 100.

Then, the portions of the covering H unnecessary for covering the substrate K are trimmed. As a result, the instrument panel P having the substrate K and the covering H formed as an integral body is obtained.

The illustrated embodiment has the advantages described below.

(1) In the vacuum forming method of the illustrated embodiment, the covering H is arranged between the first mold 200 and the second mold 100 with the first mold 200 and the second mold 100 maintained at the respective open positions. The peripheral edge of the covering H is then held by the clamps 450 (holding members) such that the covering H is maintained in a flat state. The covering H, which is held by the clamps 450, is then heated by the heater 300.

Subsequently, the clamps 450 are moved from the positions where the clamps 450 may interfere with the first mold 200 and the second mold 100 to the standby positions, where the clamps 450 are prevented from interfering with the first and second molds 200, 100. The covering H is thus stretched.

Then, by closing the molds, the stretched covering H is brought into contact with the substrate K, which is mounted in advance on the support surface 101 of the second mold 100, and deformed in correspondence with the shape of the forming surface 201 (the inner surface) of the first mold 200. In this state, the molding space S is subjected to vacuum suction via the first mold 200 to shape the front surface of the covering H in correspondence with the shape of the forming surface 201 of the first mold 200. After stopping the vacuum suction via the first mold 200, the molding space S is subjected to vacuum suction via the air vent portion of the second mold 100 and the fine air passages of the substrate K. This bonds the covering H to the substrate K.

As a result, in the method of the illustrated embodiment, the clamps 450 are prevented from interfering with the first and second molds 200, 100 even when the material forming the covering H is reduced in size. Also, by employing such a small-sized material for the covering H, the cost for the covering H is saved.

(2) The vacuum forming apparatus 50 of the illustrated embodiment has the first mold 200 and the second mold 100. The vacuum forming apparatus 50 also includes the frame members 410, 411, 430, 431 (the support device), which have the clamps 450 (holding members), and the heater 300. The clamps 450 support the peripheral edge of the covering H arranged between the first mold 200 and the second mold 100 such that the covering H is maintained in a flat state when the molds are open. In this state, the covering H held by the clamps 450 is heated by the heater 300. By closing the molds, the covering H, which has been heated by the heater 300, is brought into contact with the substrate K mounted in advance on the support surface 101 of the second mold 100 and thus deformed in correspondence with the shape of the forming surface 201 (the inner surface) of the first mold 200. In this state, the molding space S is subjected to vacuum suction via the first mold 200 to shape the front surface of the covering H in correspondence with the shape of the forming surface 201 of the first mold 200. After the vacuum suction via the first mold 200 is stopped, the molding space S is subjected to vacuum suction via the air vent portion of the second mold 100 and the fine air passages of the substrate K. The covering H is thus bonded to the substrate K.

The frame members 410, 411, 430, 431 are (the support device is) movable between the positions where the clamps 450 may interfere with the first mold 200 and the second mold 100 and the standby positions, where the clamps 450 are prevented from interfering with the molds. By moving the clamps 450 from the positions where the first mold 200 and the second mold 100 may be interfered by the clamps 450 to the standby positions, the covering H, which is held by the clamps 450 and has been heated by the heater 300, is stretched.

As a result, in the vacuum forming apparatus 50 of the illustrated embodiment, the clamps 450 are prevented from interfering with the first mold 200 and the second mold 100 even when the material for the covering H is reduced in size. Further, by employing a comparatively small-sized material for the covering H, the cost for the covering H is saved.

The illustrated embodiment may be modified to the forms described below.

Although the article of the illustrated embodiment is an instrument panel, which is an interior component of a vehicle, the article may be any suitable interior component other than the instrument panel. Further, the article is not restricted to interior components of a vehicle.

In the illustrated embodiment, the outer frame 404 of the covering clamp device 400 is inclinable about the axis O. However, the outer frame 404 may be arranged constantly horizontal regardless of whether the molds are open or closed.

In the illustrated embodiment, the frame members 410, 411 are movable in the mutually opposite directions through rotation of the threaded bars 416, 417 of the covering clamp device 400. However, instead of this configuration, the frame members 410, 411 may be operably connected to threaded bars used exclusively for the respective frame members 410, 411 such that the frame members 410, 411 become movable in opposite directions independently from each other.

In the illustrated embodiment, the frame members 430, 431 are movable in the mutually opposite directions by means of the threaded bars 436, 437 of the covering clamp device 400. However, instead of this configuration, the frame members 430, 431 may be operably connected to threaded bars used exclusively for the respective frame members 430, 431 such that the frame members 430, 431 become movable in opposite directions independently from each other.

A motor may be operably connected to each of the frame members through a deceleration mechanism such that each opposing pair of the frame members becomes movable in mutually opposite directions.

DESCRIPTION OF THE REFERENCE NUMERALS

50 . . . vacuum forming apparatus, 100 . . . second mold, 200 . . . first mold, 300 . . . heater, 400 . . . covering clamp device, 410, 411, 430, 431 . . . frame member (support device), 450 . . . clamp (holding member), H . . . covering, K . . . substrate.

The invention claimed is:
1. A vacuum forming method for shaping an article having a covering bonded to a surface of a substrate, which has an air passage, in a molding space using a first mold having a forming surface for shaping a front surface of the covering and a second mold having a support surface for supporting the substrate, the method comprising:
configuring the first mold and the second mold to be movable thorough a movement range between a respective closed position for forming the molding space and a respective open position for opening the molding space;
arranging a support device between the first mold and second mold, the support device comprising a rectangular outer frame, a shaft configured to support the outer frame allowing to incline about an axis along a longitudinal direction of the outer frame, a first pair of frame members mounted on the outer frame, the first pair of frame members being configured to be movable in a transverse direction of the outer frame, a second pair of frame members mounted on the outer frame, the second pair of frame members being configured to be movable in a longitudinal direction relative to the outer frame, and a plurality of holding members attached to the first and second pairs of frame members, wherein first ends of the first pair of frame members are coupled to a first threaded shaft, wherein second ends of the first pair of frame members, opposite the first ends of the first pair of frame members, are coupled to a second thread shaft, wherein the first pair of frame members are movable toward and away from each other as the first and second threaded shafts are rotated by a first motor through a first gear mechanism comprising a first transmission shaft coupled to the first and second threaded shafts, wherein first ends of the second pair of frame members are coupled to a third threaded shaft, wherein second ends of the second pair of frame members, opposite the first ends of the second pair of frame members, are coupled to a fourth threaded shaft, wherein the second pair of frame members are movable toward and away from each other as the third and fourth threaded shafts are rotated by a second motor through a second gear mechanism comprising a second transmission shaft coupled to the third and fourth threaded shafts, and wherein the first motor and the second motor are fixed to a respective outer side of the frame member forming the outer frame, such that both first and second motors have output shafts that extend parallel to the shaft and are symmetrically arranged with each other with respect to the shaft;

arranging the substrate on the second mold moving the first mold and the second mold at the open position;

holding a peripheral edge of the covering with the plurality of holding members between the first mold and the second mold arranged at the open position, such that the back surface of the covering faces the curved portion of the substrate and the front surface of the covering faces the first mold;

when the first mold and the second mold are moved at the open position, heating the covering held by the holding members with a heater, rotating the outer frame about the axis of the shaft so that the covering is inclined while continuously stretching the softened covering by moving the first pair of frame members such that holding members attached to the frame members of the first pair of frame members are moved from an interference position, wherein the holding members attached to the frame member of the first pair of frame members are located within the movement range of the first mold and the second mold, to a first standby position wherein the holding members attached to the frame members of the first pair of the frame members are located outside the movement range, and moving the second pair of frame members such that holding members attached to the frame members of the second pair of frame members are moved from an interference position, wherein the holding members attached to the frame members of the second pair of frame members are located within the movement range of the first mold and the second mold, to a second standby position wherein the holding members attached to the frame members of the second pair of frame members are located outside the movement range;

moving the first mold and the second mold toward the closed position with the substrate mounted on the support surface of the second mold to cause the stretched covering to contact the substrate and deform the covering in correspondence with a shape of the forming surface of the first mold, and performing vacuum suction of the molding space via the first mold at the closed position to shape the covering in correspondence with the shape of the forming surface; and after the vacuum suction via the first mold is stopped, performing vacuum suction of the molding space via the second mold and the air passage of the substrate, thereby bonding the covering to the substrate.

2. A vacuum forming apparatus for shaping an article having a covering bonded to a surface of a substrate, which has an air passage, in a molding space, the vacuum forming apparatus comprising:

a first mold and a second mold, which are movable thorough a movement range between a respective closed position for forming the molding space and a respective open position for opening the molding space, the first mold having a forming surface for the covering, the second mold having a support surface for the substrate;

a support device comprising a rectangular outer frame, a shaft configured to support the outer frame allowing to incline about an axis along a longitudinal direction of the outer frame, a first pair of frame members mounted on the outer frame, the first pair of frame being configured to be movable in a traverse direction relative to the outer frame, a second pair of frame members mounted on the outer frame, the second pair of frame being configured to be movable in a longitudinal direction relative to the outer frame, and a plurality of holding members attached to the first and second pairs of frame members, wherein the plurality of holding members are configured for holding a peripheral edge of the covering to spread the covering in a flat state between the first mold and the second mold arranged at the open position; and a heater for heating the covering held by the holding members when the first mold and the second mold are arranged at the open position, wherein the first mold and the second mold are configured to be moved toward the closed position with the substrate mounted on the support surface of the second mold to cause the covering, which has been heated by the heater, to contact the substrate and deform the covering in correspondence with a shape of the forming surface of the first mold, and performing vacuum suction of the molding space via the first mold at the closed position to shape the covering in correspondence with the shape of the forming surface, wherein after the vacuum suction via the first mold is stopped, vacuum suction of the molding space is performed via the second mold and the air passage of the substrate, thereby bonding the covering to the substrate, wherein the support device is configured to be movable between an interference position, wherein the holding members attached to the frame members of the first pair of frame members are located within the movement range of the first mold and the second mold and the holding members attached to the frame members of the second pair of frame members are located within the movement range of the first mold and the second mold, and a standby position, wherein the holding members attached to the frame members of the first pair of frame members are located outside of the movement range of the first mold and the second mold and the holding members attached to the frame members of the second pair of frame members are located outside of the movement range of the first mold and the second mold, and when moving to the standby position, the support device is configured to rotate the outer frame about the axis of the shaft so that the covering is inclined while continuously stretching the softened covering, which is held by the holding members and has been heated by the heater, wherein first ends of the first pair of frame members are coupled to a first threaded shaft, second ends of the first pair of frame members, opposite the first ends of the first pair of frame members, are coupled to a second threaded shaft, first ends of the second pair of frame members are coupled to a third threaded shaft, and second ends of the second pair of frame members, opposite the first ends of the second pair of frame members are coupled to a fourth threaded shaft and wherein the first pair of frame members are movable toward and away from each other when the first and second threaded shafts are rotated by a first motor through a first gear mechanism comprising a first transmission shaft coupled to the first and second threaded shafts, and the second pair of frame members are movable toward and away from each other as the second third and fourth threaded shafts are rotated by a second motor through a second gear mechanism comprising a second transmission shaft coupled to the third and fourth threaded shafts, wherein the first motor and the second motor are fixed to a respective outer side of the frame member forming the outer frame, such that both first and second motors have output shafts that extend parallel to the shaft and are symmetrically arranged with each other with respect to the shaft, and wherein the holding members are mounted at spaced apart intervals on the first and second pairs of frame members.

3. The vacuum forming apparatus according to claim 2, comprising at least one bearing that enables the support device to rotate and support the covering in an inclinable manner via the shaft.

4. The vacuum forming apparatus according to claim 2, wherein the heater is movable between a heating position arranged in the movement range of the first mold and the second mold and a heater-standby position outside the movement range, and the heater is arranged at the heating position to heat and soften the covering when the first mold and the second mold are located at the open position.

\* \* \* \* \*